United States Patent [19]

Schreiber et al.

[11] Patent Number: 5,699,394
[45] Date of Patent: Dec. 16, 1997

[54] THERMAL INSULATING BARRIER AND NEUTRON SHIELD PROVIDING INTEGRATED PROTECTION FOR A NUCLEAR REACTOR VESSEL

[75] Inventors: Roger B. Schreiber, Penn Twp.; Arnold H. Fero, New Kensington; James Sejvar, Murrysville, all of Pa.

[73] Assignee: Westinghouse Electric Corporation, Pittsburgh, Pa.

[21] Appl. No.: 502,236

[22] Filed: Jul. 13, 1995

[51] Int. Cl.$^6$ .................................................. G21C 15/18
[52] U.S. Cl. ........................ 376/289; 376/283; 376/299; 376/280
[58] Field of Search .......................... 376/280, 282, 376/283, 289, 298, 299

[56] References Cited

U.S. PATENT DOCUMENTS

| | | | |
|---|---|---|---|
| 4,061,535 | 12/1977 | Nolan et al. | 376/283 |
| 4,574,070 | 3/1986 | Blaushild et al. | 376/289 |
| 4,797,247 | 1/1989 | Blaushild et al. | 376/289 |
| 5,268,944 | 12/1993 | Ekeroth et al. | 376/289 |
| 5,343,506 | 8/1994 | Artnik et al. | 376/289 |

Primary Examiner—Daniel D. Wasil

[57] ABSTRACT

The reactor vessel of a nuclear reactor installation which is suspended from the cold leg nozzles in a reactor cavity is provided with a lower thermal insulating barrier spaced from the reactor vessel to form a chamber which can be flooded with cooling water through passive valving to directly cool the reactor vessel in the event of a severe accident. The passive valving also includes bistable vents at the upper end of the thermal insulating barrier for releasing steam. A removable, modular neutron shield extending around the upper end of the reactor cavity below the nozzles forms with the upwardly and outwardly tapered transition on the outer surface of the reactor vessel, a labyrinthine channel which reduces neutron streaming while providing a passage for the escape of steam during a severe accident, and for the cooling air which is circulated along the reactor cavity walls outside the thermal insulating barrier during normal operation of the reactor.

16 Claims, 7 Drawing Sheets

THERMAL INSULATING BARRIER AND NEUTRON SHIELD PROVIDING INTEGRATED PROTECTION FOR A NUCLEAR REACTOR VESSEL

GOVERNMENT CONTRACT

The Government of the United States of America has rights in this invention pursuant to Contract No. DE-AC03-90SF18495 awarded by the Department of Energy.

BACKGROUND OF THE INVENTION

1. Field of the Invention

This invention relates to an apparatus providing thermal insulation and protection from neutron streaming in a nuclear reactor while at the same time permitting the reactor vessel to be surrounded passively with cooling water in the event of a severe accident in which the core material melts.

2. Background Information

The reactor vessel of a nuclear reactor installation must be provided with biological shielding to protect personnel and the surrounding area from the high neutron flux and radiation produced by the fission reactions within the core of the reactor. Typically, in commercial nuclear power plants, this biological shielding is provided by a massive concrete structure within containment defining a cavity in which the reactor vessel is suspended by supports under its inlet nozzles. In order to protect the concrete walls of the reactor cavity from high temperatures and for thermal efficiency of the process, the reactor vessel is provided with thermal insulation. Typically, the thermal insulation is applied directly to the outer surface of the reactor vessel. This requires removal of the thermal insulation for periodic inspection of the vessel welds. U.S. Pat. No. 5,268,944 suggests an arrangement in which an octagonal configuration of insulating panels is placed around the upright cylindrical reactor vessel to provide a space in which remotely operated inspection equipment can monitor the welds without the removal of the insulation.

In addition to the thermal insulation, it is common to circulate cooling air over the walls of the reactor cavity. This cooling air flows out of the reactor cavity laterally through the vessel supports.

Another consideration for designers of nuclear power plants is neutron streaming which is the flow of neutrons upward out of the reactor cavity. Typically, neutron absorbing material has been provided around the reactor vessel above the inlet and outlet nozzles. However, the farther from the core that the neutron stream is intercepted the greater the area of protection is required.

The assignee of this invention has developed a design for a nuclear power plant provided with passive protection systems, that is systems which do not require human intervention, to respond to abnormal conditions in the operation of the reactor. Attention has recently been directed toward passive response to a severe accident which is postulated as a melt-down of the reactor core. It has been determined that the integrity of the reactor vessel can be maintained if the vessel can be immersed in cooling water which is free to vaporize and carry off the heat as steam. One of the passive systems currently available utilizes the large volume of refuelling water maintained within containment for flooding the vessel cavity. For a severe accident in which the core of the reactor melts, it is essential that the large volume of cooling water be applied directly to the vessel.

There is a need therefore for an apparatus which can respond to a severe accident and passively immerse the reactor vessel directly in cooling water which is free to vaporize and disperse from the reactor vessel cavity.

There is also a need to continue to provide thermal insulation for the reactor vessel to protect the concrete walls of the reactor cavity.

There is also a need to continue to provide air cooling for the reactor cavity walls, but without cooling the reactor vessel itself.

There is also a need for providing protection against neutron streaming to locations outside the reactor cavity.

There is also a need to simultaneously accommodate all of the above needs economically and reliably without the need for human intervention.

SUMMARY OF THE INVENTION

These needs and others are satisfied by the invention which is directed to an apparatus which provides thermal insulation for the reactor vessel, neutron shielding which reduces neutron streaming, and air cooling of the walls of the reactor cavity during normal operation of the reactor. The apparatus also provides for the direct application of cooling water to the reactor vessel and escape of the resultant steam produced during a severe accident. A thermal insulating barrier encloses but is spaced from the portion of the reactor vessel suspended in the reactor cavity. The thermal insulating barrier is also spaced from the walls of the vessel cavity so that the cooling air can be circulated along the walls during normal operation. During a severe accident, cooling water is introduced into the chamber formed between the reactor vessel and the thermal insulating barrier by cooling means, preferably comprising passive means, which also releases the steam at the upper end of the thermal insulating barrier formed by the vaporization of the cooling water by the hot reactor vessel. The passive means includes first valve means provided in a nozzle in the lower inverted conical part of the thermal insulating barrier. This first valve means comprises one or more valve members having sufficient weight to remain seated on valve seats and block entrance of cooling air into the chamber during normal operation, but which are buoyant and are floated off of the valve seats to introduce the cooling water into the chamber around the reactor vessel when cooling water is introduced into the reactor cavity in response to a severe accident.

The passive means also includes second valve means at the upper end of the upper cylindrical part of the thermal insulating barrier which is opened by the steam to vent the chamber. The second valve means includes a bistable valve member which is operated from a closed position to an open position by steam pressure. Preferably, the bistable valve member is pivoted about a horizontal axis adjacent its lower end and is positioned to one side of vertical to the closed position and is operated by steam pressure to pass through the vertical to the open position where it remains until it is reset.

The neutron shield is a removable modular shield which extends around the vessel adjacent the upper end of the reactor cavity and below the nozzles. This removable modular neutron shield has on its inner edge an upwardly and outwardly tapered surface which confronts, but is spaced from the upwardly and outwardly tapered surface on the vessel below the nozzles to form a labyrinthine channel leading out of the space between the walls of the reactor cavity and the thermally insulating barrier. This arrangement permits escape of the cooling air during normal operation and steam during a severe accident while at the same time reducing neutron streaming.

Preferably, the upper end of the thermally insulating barrier tapers upwardly and inwardly below the neutron shield. Conveniently, it is in this tapered surface that this second bistable valve means for releasing steam formed in the chamber between the thermal insulating barrier and the reactor vessel is located.

In accordance with the invention, the thermal insulating barrier and the neutron shield cooperate to provide heat retention for the vessel and air cooling of the vessel cavity walls during normal operation in addition to reduction of neutron streaming. During a severe accident, they provide direct water cooling of the vessel and release of the steam generated.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
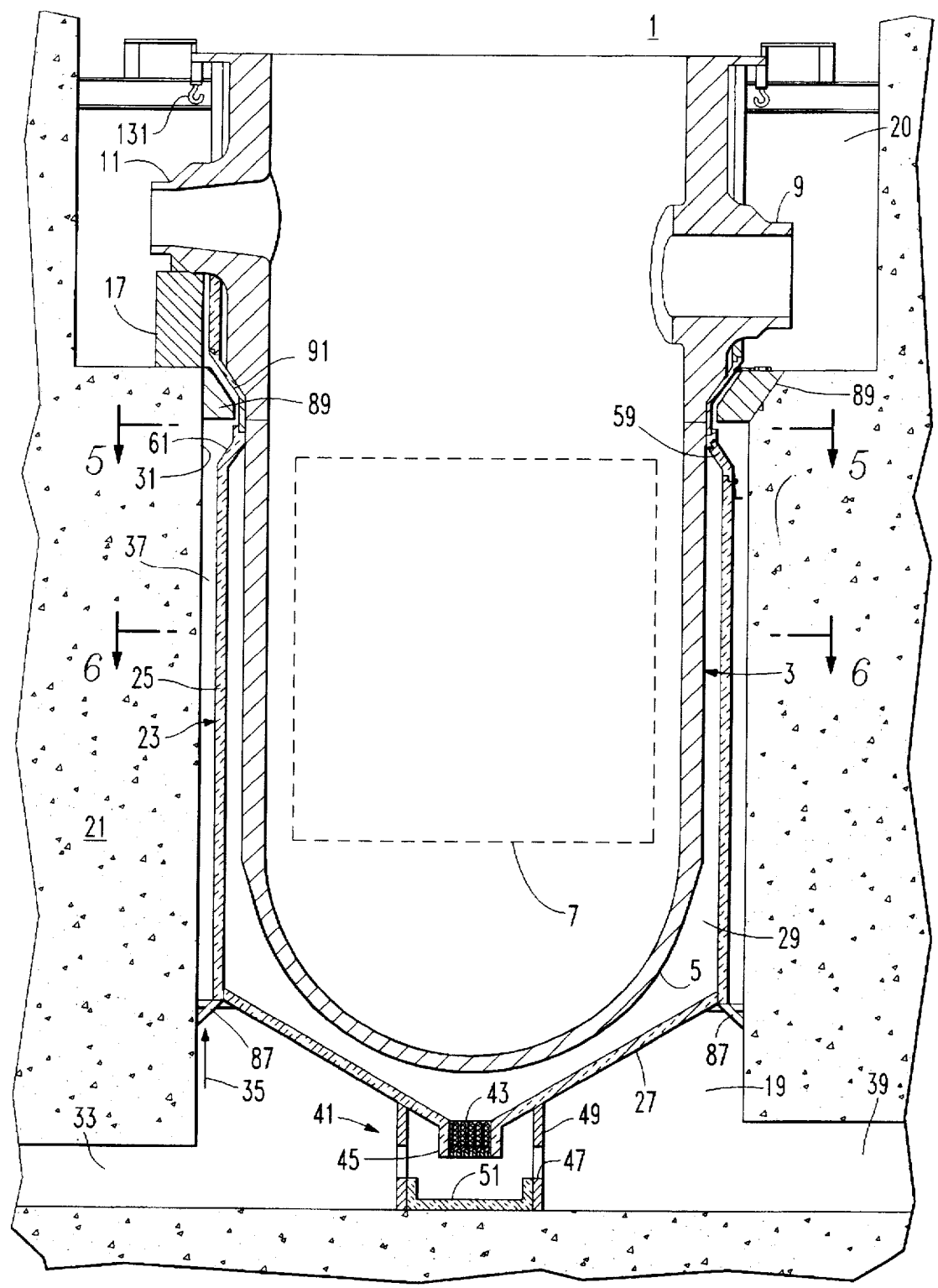
FIG. 1 is a vertical sectional view through a nuclear reactor installation incorporating the invention.
Figure 2:
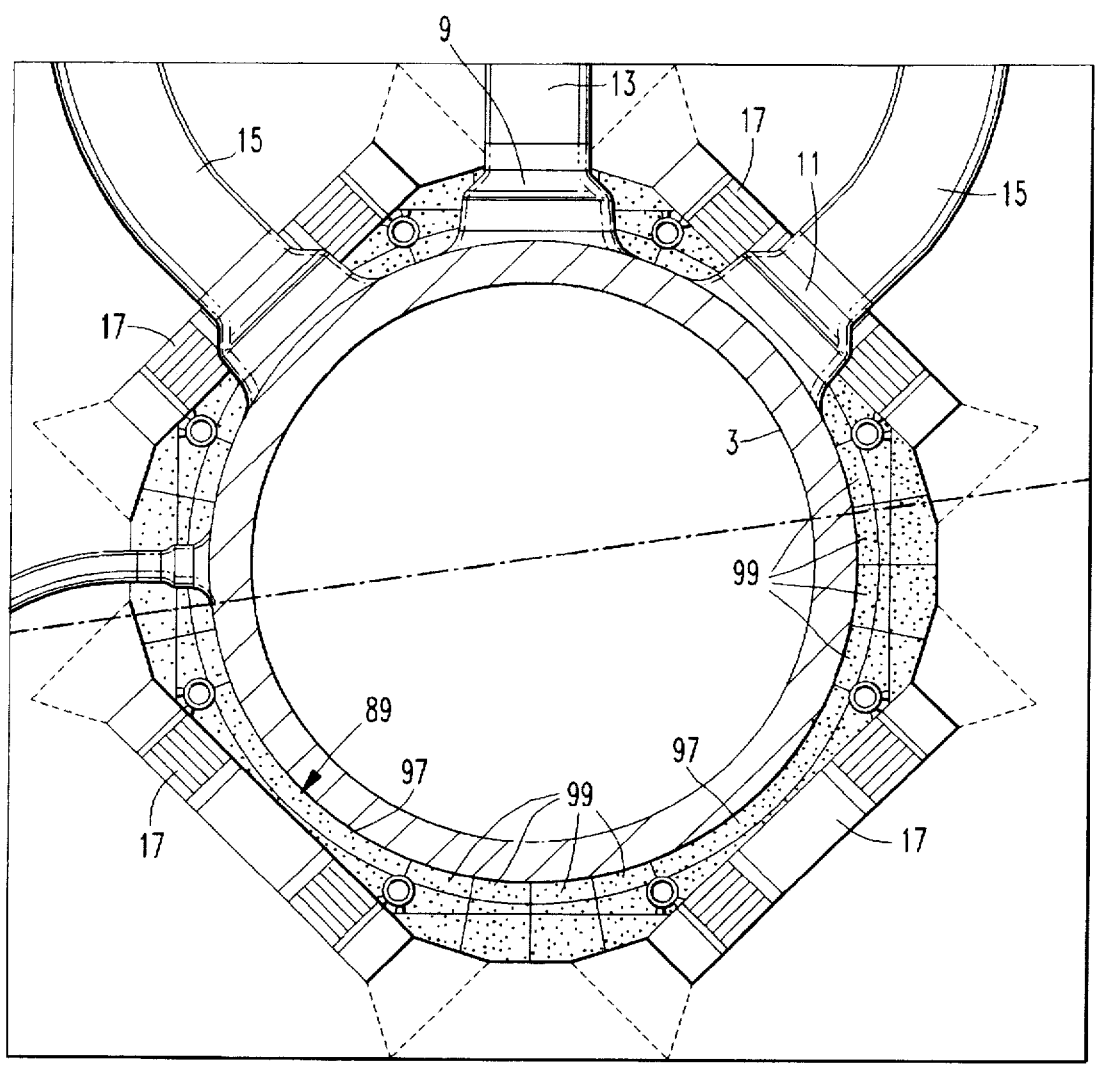
FIG. 2 shows in the upper half, above the phantom line, a plan view taken from above the nozzles of the reactor installation shown in FIG. 1 and the lower half is a plan view taken below the nozzles.

FIG. 1 illustrates the pertinent portions of a nuclear reactor installation 1 in the form of an advanced pressurized water reactor. The reactor includes an upright cylindrical vessel 3 having a hemispherical lower end 5. The reactor vessel 3 contains a core 7 of fissionable material. As is well known, reactor coolant in the form of light water is circulated through the core. The hot coolant is discharged through hot leg nozzles 9 for circulation through a steam generator (not shown) which utilizes the heat in the coolant to generate steam for a turbine generator (also not shown). The coolant is returned to the reactor vessel 3 through cold leg nozzles 11. The exemplary plant is a two-loop installation, that is, the single reactor supplies heated coolant for two steam generators. As illustrated in FIG. 2, each loop includes one hot leg 13 connected to a hot leg nozzle 9 and two cold legs 15 connected to cold leg nozzles 11. While FIG. 2 only shows the nozzle arrangement for one loop, the corresponding nozzles for the other loop are diametrically opposed.

The reactor vessel 3 is supported on four supports 17 upon which the cold leg nozzles 11 rest with the vessels suspended in a reactor cavity 19. The nozzle chamber 20 in which the vessel is supported is square while the reactor cavity 19 is octagonal in plan view. The reactor cavity 19 is defined by a massive concrete structure 21 which forms a biological shield which protects personnel as well as adjacent structures and equipment from the high neutron flux and radiation generated within the core 7 of the reactor.

The reactor vessel 3 is provided with a lower thermal insulating barrier 23 which has a generally cylindrical upper part 25 and an inverted conical lower part 27. The thermal barrier 23 is spaced from the reactor vessel 3 to form a chamber 29. The thermal barrier 23 insulates the reactor vessel 3 for thermal efficiency, and also protects the concrete walls 31 of the reactor cavity 19 from the high temperature of the reactor vessel's outer surface. In addition, cooling air, introduced at the bottom of the reactor cavity 19 through tunnel 33 flows upward as shown by the arrow 35 along the walls 31 through the space 37 between the walls and the thermal insulating barrier 23. The discharge path for the air will be discussed in more detail below.

In the event of a loss of coolant accident (LOCA), cooling water is introduced into the reactor cavity 19 through a cooling water tunnel 39. In the case of a severe accident wherein the core 7 melts and settles to the hemispherical lower end 5 of the reactor vessel, it is essential that the cooling water come into direct contact with the reactor vessel 3. On the other hand, under nonaccident conditions the cooling air should only flow along the cavity walls 31 and should not contact the reactor vessel 3. Therefore, passive valving 41 is provided to block the entrance of air into the chamber 29 but allow the introduction of the cooling water. The high temperature of the reactor vessel causes the cooling water to vaporize, and hence the passive valving must also provide for escape of the steam. Thus, the passive valving 41 includes a first, core inlet valve 43 mounted in a nozzle 45 at the lower end of the inverted conical part 27 of the thermal insulating barrier 23. Cooling water reaches the inlet valve 43 through openings 47 in a cylindrical skirt 49 which supports the inverted conical part 27. Thermal insulation 51 is provided to protect the concrete floor of the vessel cavity 19 from the high temperature of the reactor vessel.

Figure 3:
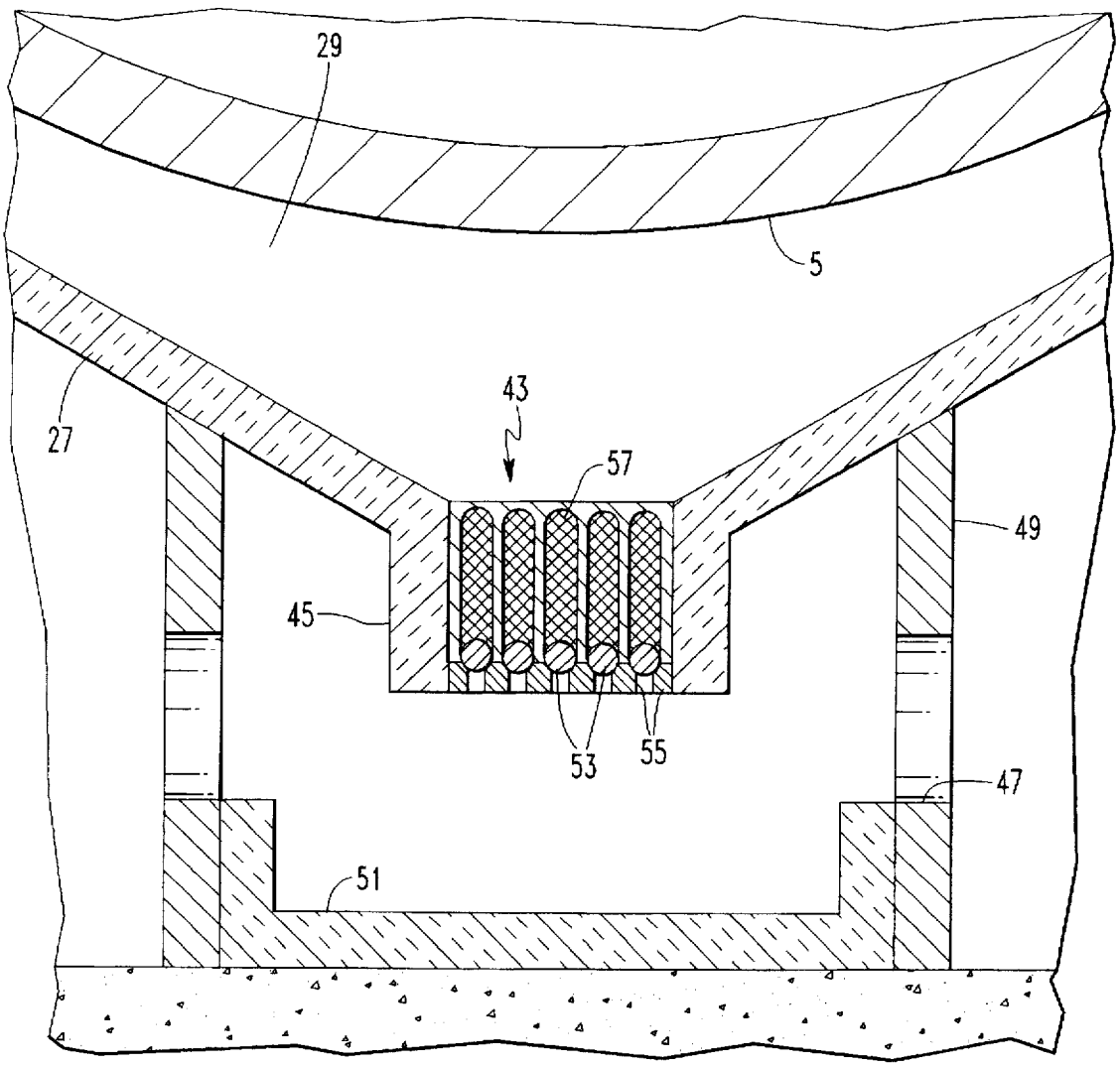
FIG. 3 is a fractional view in enlarged scale of the lower portion of FIG. 1 illustrating the valve which allows cooling water to enter the chamber between the thermal insulating barrier and the reactor vessel.

The valve 43 is shown in greater detail in FIG. 3. This valve includes a plurality of preferably spherical valve elements 53 which seat under gravity on valve seats 55. The valve elements 53 have sufficient weight that they are not lifted off of the valve seats 55 by the flow of cooling air 35. However, the valve elements 53 are buoyant and are lifted off the valve seats by the rising level of cooling water introduced into the reactor cavity 19. The valve elements 53 are maintained in alignment with the respective valve seats by cages 57. The total inlet area of these valves is generally sized to maintain neglible pressure drop across the valve 43. As a result there is essentially no net force on the thermal insulating barrier 23 resulting from differences in the head of water inside and outside of the barrier.

Figure 4:
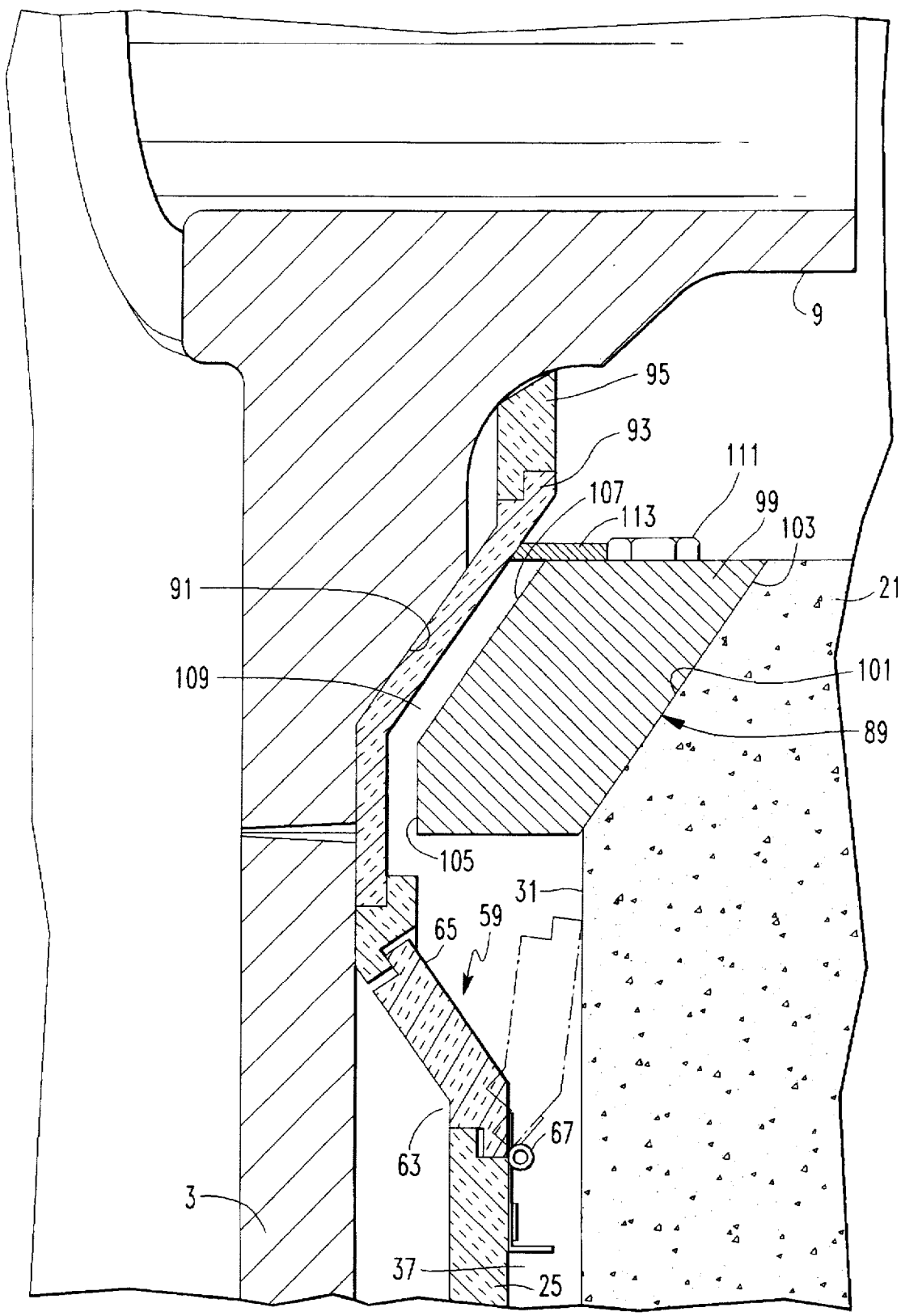
FIG. 4 is a fractional view in enlarged scale illustrating the valve for allowing steam to escape from the chamber between the reactor vessel and the thermal insulating barrier and also showing the neutron shielding below the hot leg nozzle in accordance with the invention.

The cooling water entering the chamber 29 through the inlet valve 43 absorbs heat from the reactor vessel 3 to generate steam which must be vented. To this end, the passive valving 41 includes second, outlet valves 59 located adjacent the upper end of the cylindrical upper part 25 of the thermal insulating barrier 23. As can be seen from the left side of FIG. 1, the upper part of the thermal insulating barrier 23 has a section 61 which tapers upwardly and inwardly toward the reactor vessel. Turning to the enlarged fragmented view of FIG. 4, it can be seen that there are openings 63 in portions of this tapered section 61 providing communication between the chamber 29 between the reactor vessel and the thermal insulating barrier 23 and the space 37 between the thermal insulating barrier and the walls 31 of the reactor cavity 19. The outlet valves 59 each include a flapper valve element 65 which is pivoted adjacent a lower end about a horizontally pivoted hinge 67. The upper end of the valve element 65 and the adjacent edge of the tapered section 61 of the thermal insulating barrier 23 are rabbeted so that each of the outlet valves 59 remain closed under the influence of gravity. The flapper valve elements 65 are buoyant so that water rising in the chamber 29, and more likely steam, rotates the flapper valve element 65 about the hinge 67 through the vertical 69 to an open position shown in dash lines in FIG. 4. As can be seen from FIGS. 1 and 5, the outlet valves 59 are only provided below the hot leg nozzles 9.

Figure 5:
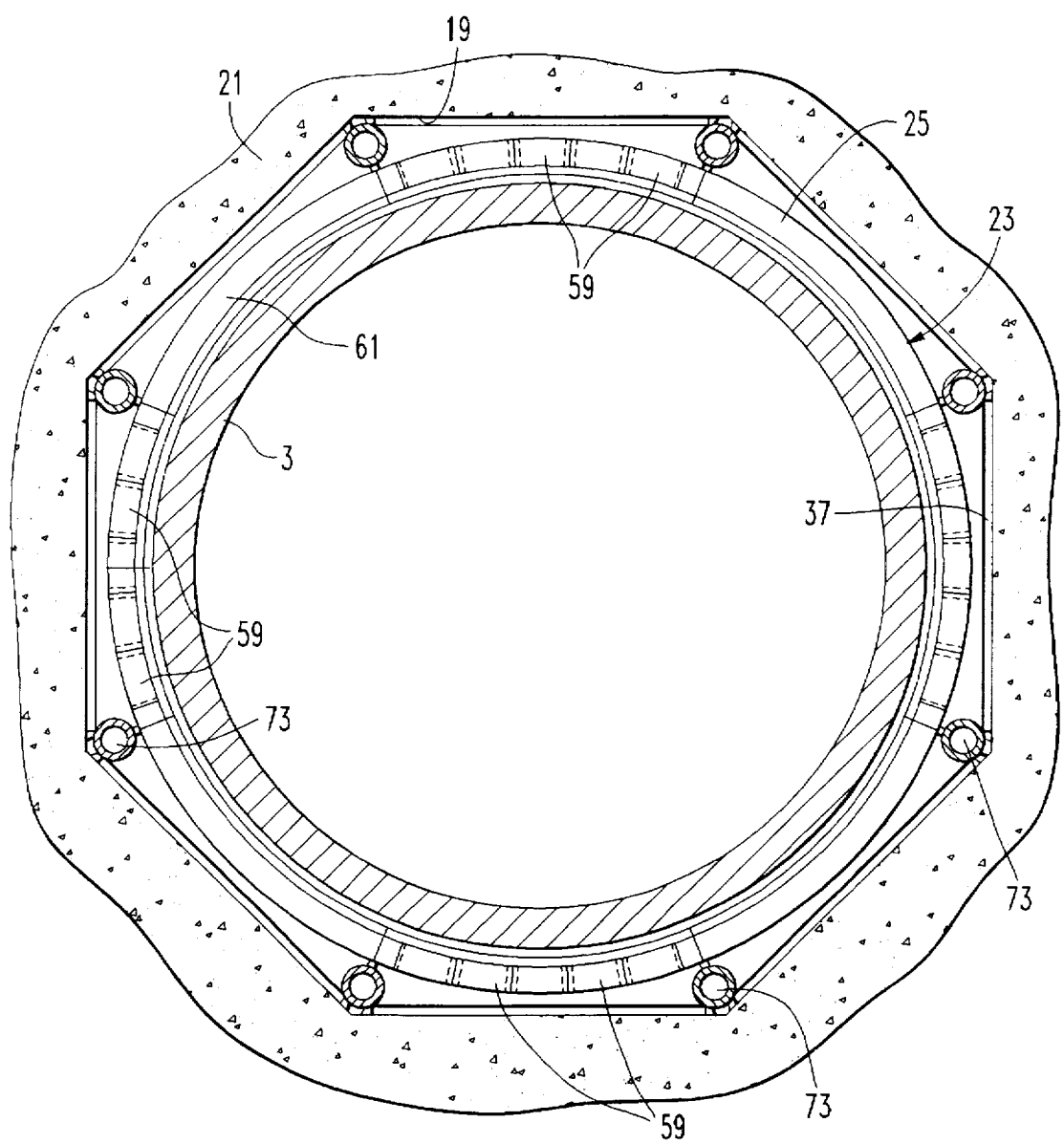
FIG. 5 is a cross-sectional view through the reactor installation of FIG. 1 taken along the line 5—5.
Figure 6:
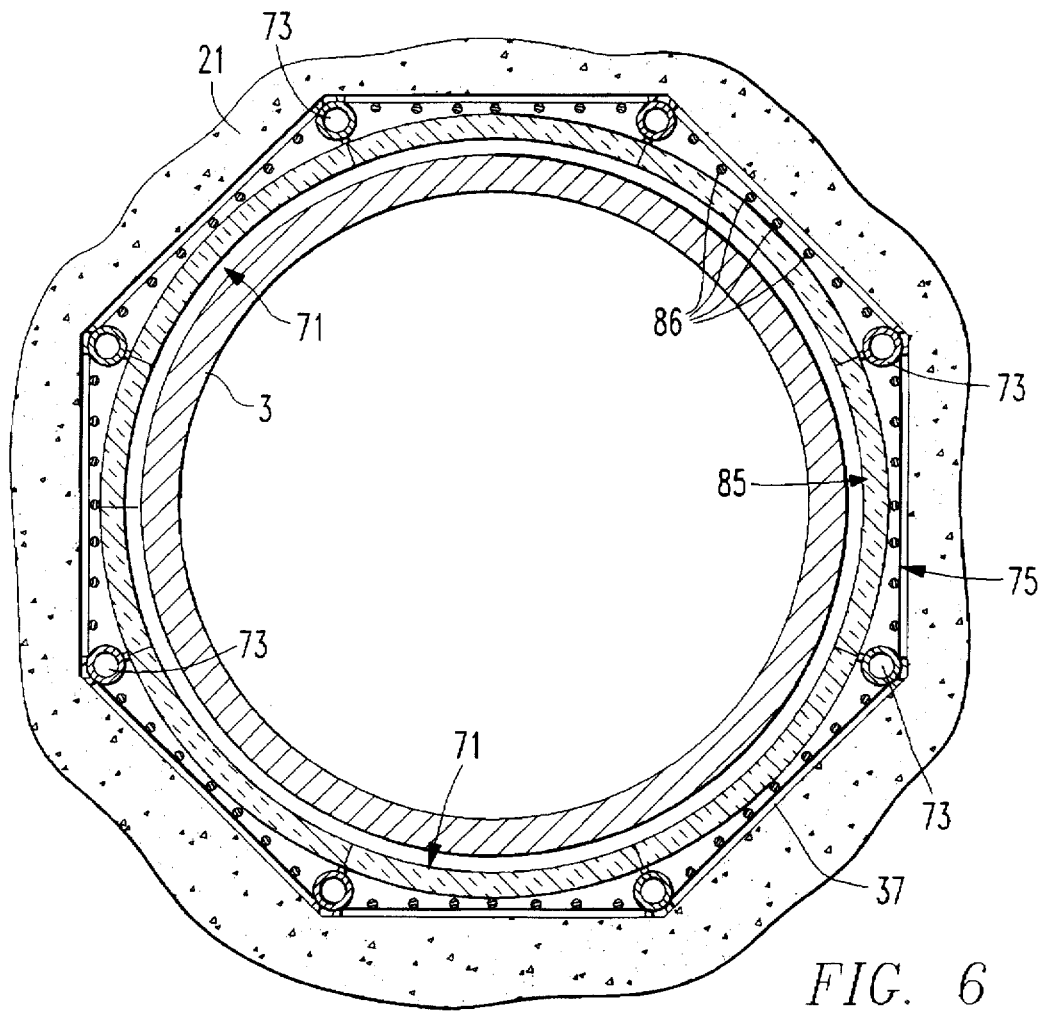
FIG. 6 is a cross-sectional view of the reactor installation of FIG. 1 taken along the line 6—6.
Figure 7:
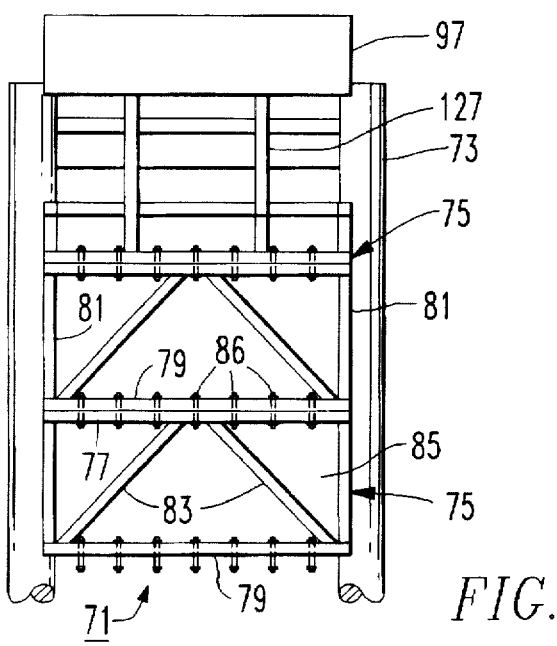
FIG. 7 is a partial elevational view illustrating detailed construction of the thermal insulating barrier in accordance with the invention.

The upper cylindrical part 25 of the thermal insulating barrier 23 is constructed in sectors 71 as can be seen in FIGS. 5–7. Each of the eight sectors 71 is aligned with one of the eight side walls 31 of the vessel cavity 19. As is common practice, eight tubular excore detectors units 73 are mounted in each of the corners of the hexagonal reactor cavity 19. Each of the sectors 71 of the thermal insulating barrier 23 have a number of sections 75, stacked one on top of another. Each section 75 includes upper and lower frame members 77 and 79, each of which has an arcuate inner edge and a straight outer edge. The upper and lower frame members 75 and 77 are connected at their ends by vertical channels 81, which are engaged and are slidable on the tubular excore detector units 73. Braces 83 between the upper and lower frame member 77 and 79 stiffen the sections 75. Arcuate insulation panels 85 are clipped to the frame members 77 and 79. The stacked sections 75 in each sector 71 are secured together by bolts 86 through adjacent frame members. Sections of the cylindrical part 25 of the thermal insulating barrier 23 are inserted from the bottom of the vessel cavity 19 and held in position by brackets 87. Additional support is provided for the sectors under the cold leg nozzles 11 as will be described below.

Neutron shielding is provided in the form of a removable, modular shield ring 89 provided between the reactor vessel 3 and the biological shield 21 at the upper edge of the reactor vessel cavity 19, below the nozzles 9 and 11. This places the neutron shielding at the level of the reactor vessel where the outer surface 91 of the vessel wall tapers upwardly and outwardly to provide a thicker mounting for the nozzles. A thin layer of thermal insulation 93 is applied directly to this tapered surface 91 and extends downward to join the thermal insulating barrier 23 and upward to join a thicker cylindrical upper insulation barrier 95. This can be seen best from FIG. 8.

The shield ring 89 is composed of large, single modules 97 in the sectors under the cold leg nozzles 11 and a number of smaller modules 99 in the remainder of the sectors 71. Installation of the smaller modules 99 is illustrated best in FIG. 4. As can be seen, the upper edge of the vessel cavity 19 is chamfered at 101. The modules 99 have an outer surface 103 which is complimentary to the chamfered surface 101. The inner edge of the module 99 has an axial section 105 and a tapered section 107 which confronts the tapered surface 91 on the reactor vessel 3 to form a channel 109. The modules 99 are secured in place by a bolt 111 or other suitable retainer. The channel 109 provides a labyrinthine path leading from the space 37 between the thermal insulating barrier 23 and the reactor cavity 19. A seal plate 113 blocks passage of cooling air and steam out of the channel 109 in all of the sectors except through the vessel supports 17 under the cold leg nozzles 11. With the arrangement shown in FIG. 4, the modules 99 can be installed and removed from above.

Figure 8:
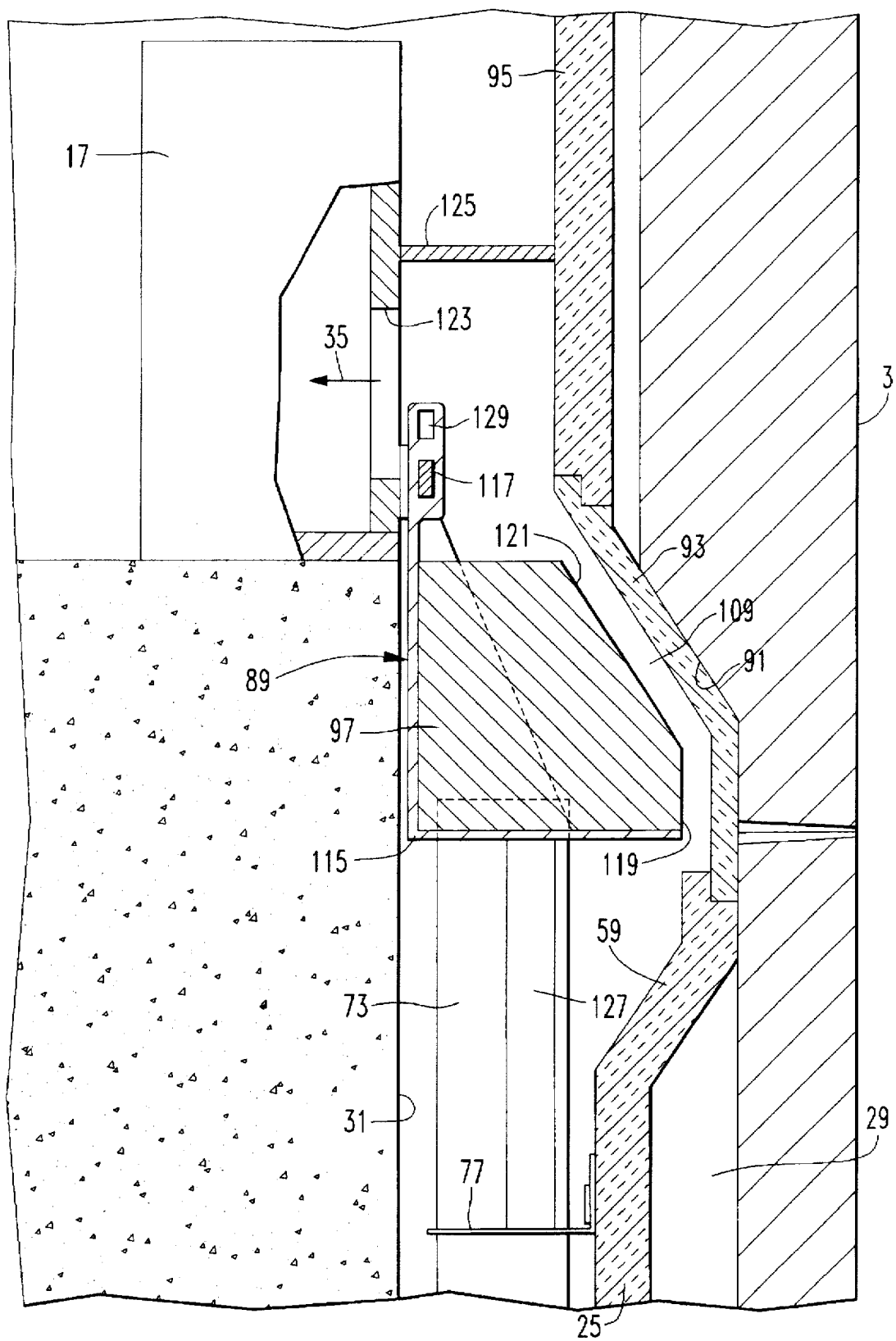
FIG. 8 is a fractional view in enlarged scale of a portion of the neutron shielding below the cold leg nozzles in accordance with the invention.

The large modules 97 located in sectors 71 below the cold leg nozzles 11 are shown in FIG. 8. The modules 97 are supported by an L-shaped bracket 115 suspended by a locking bar 117 from the support 17. As in the case of the smaller modules 99, the modules 97 have an inner edge with an axial section 119 and a section 121 which tapers upwardly and outwardly in confronting but spaced relation to the tapered surface 91 on the reactor vessel to also form the labyrinthine channel 109. The cooling air and steam pass upward through the channel 109 and through an opening 123 in the support 17. Thus, during normal operation, the cooling air, in addition to cooling the walls 31 of the vessel cavity 19, also cools the supports 17. A sealing plate 125 blocks off the space between the reactor vessel 3 and the support 17 so that all of the air flow indicated by the arrow 35 passes through the support.

The neutron shield ring 89 attenuates the neutron stream by absorbing neutrons and by causing some of them to scatter through the labyrinthine path followed by the cooling air. Additional change in direction of the neutrons is provided by the tapered surface 91 on the reactor vessel which forms, with the neutron shielding 89, the channel 109.

The bracket 115 supporting the large shielding modules 97 also provides additional support for the upper part 25 of the thermal insulating barrier 23 through vertical braces 127 connected to the upper frame members 77 of the top sections of the sectors 71 below the cold leg nozzles 11. The modules 97 must be lowered along with the thermal insulating barrier sectors for removal and replacement through the bottom of the reactor cavity 19. To this end, the upper end of the bracket 115 has an eye 129 through which the module can be lowered by a winch 131 (see FIG. 1).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for thermally insulating a reactor vessel suspended in a reactor cavity in a nuclear reactor installation, said apparatus comprising:

a thermal insulating barrier within said reactor cavity enclosing but spaced from said reactor vessel to form a chamber between said thermal insulating barrier and said reactor vessel; and cooling means for introducing cooling water into said chamber to cool said reactor vessel in the event of a severe accident and for releasing steam produced by vaporization of said cooling water in said chamber, said cooling means comprising first valve means opened by said cooling water introduced into said reactor cavity to introduce said water into said chamber and second valve means opened by said steam formed in said chamber for allowing the release of said steam from said chamber.

2. The apparatus of claim 2, adapted for use in said nuclear reactor installation wherein air is introduced into said reactor cavity outside of said thermal insulating barrier to cool walls of said reactor cavity in the absence of said severe accident, said first valve means comprising means blocking flow of said air into said chamber but allowing flow of said cooling water from said reactor cavity outside of said thermal insulating barrier to flow into said chamber, said second valve means comprising means blocking flow of air from said reactor cavity into said chamber but allowing flow of said steam out of said chamber.

3. The apparatus of claim 2, wherein said first valve means is located adjacent a bottom end of said chamber and comprises at least one valve seat, at least one valve member having sufficient weight to seat on said valve seat to block air flow from said reactor cavity into said chamber but being sufficiently buoyant to be floated off said valve seat by water in said reactor cavity to introduce water into said chamber, and cage means maintaining said at least one valve member in alignment with said at least one valve seat.

4. The apparatus of claim 3, adapted for use in said nuclear reactor installation wherein the reactor vessel is cylindrical with a hemispherical lower end, said thermal insulating barrier comprising a cylindrical upper part and an inverted conical lower part terminating in a nozzle in which said first valve means is located.

5. The apparatus of claim 3, wherein said second valve means comprises a bistable valve member adjacent an upper end of said cylindrical upper part and having a closed position and an open position to which said bistable valve member is actuated by said steam.

6. The apparatus of claim 5, wherein said second valve means comprises a pivot member pivoting said bistable valve member about a generally horizontal axis adjacent a lower end of said bistable valve member with said closed position being on one side of vertical and said open position being on another side of vertical.

7. The apparatus of claim 2, adapted for use in said nuclear reactor installation wherein the reactor vessel is cylindrical with a hemispherical lower end, said thermal insulating barrier comprising a cylindrical upper part and an inverted conical lower part, said first valve means being positioned in said inverted conical lower part and said second valve means being positioned adjacent an upper end of said cylindrical upper part.

8. The apparatus of claim 7, wherein said first valve means is located at a bottom of said inverted conical lower part and wherein said thermal insulating barrier further includes a cylindrical skirt having a diameter smaller than a diameter of said cylindrical upper part, said cylindrical skirt supporting said inverted conical lower part and having openings for flow of water to said first valve means.

9. The apparatus of claim 8, wherein said first said valve means comprises at least one valve seat, at least one valve member having sufficient weight to seat on said valve seat to block air flow from said reactor cavity into said chamber but being sufficiently buoyant to be floated off said valve seat by water in said reactor cavity to introduce water into said chamber, and cage means maintaining said at least one valve member in alignment with said at least one valve seat.

10. The apparatus of claim 7, wherein said upper end of said cylindrical upper part of said thermal insulating barrier has a chamfer tapering upward and inward toward said reactor vessel, and said second valve means comprises a plurality of openings spaced around said chamfer and a second valve member for each opening pivoted adjacent a lower end for rotation between a closed position in which the second valve member covers said opening and an open position past vertical in which said opening is uncovered.

11. The apparatus of claim 8, adapted for use in said nuclear reactor installation having a plurality of circumferentially spaced vertically extending excore detector units in said reactor cavity and laterally spaced from said reactor vessel, said cylindrical upper part of said thermal insulating barrier comprising sectors supported between said excore detector units.

12. The apparatus of claim 11, wherein said sectors each comprise a plurality of vertically aligned sections with each section comprising a frame having guides along side edges which slidably engage said excore detector units, and panels of thermal insulating material attached to said frames.

13. The apparatus of claim 2, wherein said first valve means is sized to maintain a head of cooling water inside said chamber within a predetermined margin of a head of cooling water between said thermal insulating barrier and said walls of said reactor cavity.

14. In combination:
- an upright cylindrical reactor vessel having nozzles extending laterally adjacent an upper end of said reactor vessel;
- a biological shield defining a reactor cavity in which said reactor vessel below said nozzles is suspended leaving a space between said reactor vessel and said biological shield;
- a thermal insulating barrier within said reactor cavity enclosing but spaced from said reactor vessel to form a chamber between said thermal insulating barrier and said reactor vessel;
- passive means introducing water into said chamber adjacent a bottom end of said chamber to cool said reactor vessel in the event of a severe accident and for allowing release of steam produced by vaporization of said water in said chamber adjacent an upper end of said chamber, said cooling means comprising first valve means opened by said cooling water introduced into said reactor cavity to introduce said water into said chamber and second valve means opened by said steam formed in said chamber for allowing the release of said steam from said chamber;
- means introducing cooling air into said reactor cavity outside said thermal insulating barrier; and
- a neutron shield extending circumferentially around said reactor vessel adjacent an upper end of said reactor cavity and below said nozzles, said neutron shield providing passage for air and steam out of said reactor cavity.

15. The combination of claim 14, wherein said reactor vessel has an upwardly and outwardly tapered surface below said nozzles and adjacent said upper end of said reactor cavity, and said neutron shield is mounted to said biological shield adjacent said upper end of said reactor cavity and has an inner upwardly and outwardly tapered surface confronting but spaced from said tapered surface on said reactor vessel to form an upwardly and outwardly inclined channel for passage of said air and said steam out of said reactor cavity.

16. The combination of claim 15, wherein said thermal insulating barrier has a cylindrical upper part having an upper end which tapers upwardly and inwardly toward said reactor vessel under said neutron shield to deflect said air from said reactor cavity inwardly and upwardly towards said upwardly and outwardly inclined channel.

* * * * *